United States Patent
Terai et al.

(10) Patent No.: US 12,280,763 B1
(45) Date of Patent: Apr. 22, 2025

(54) METHOD AND DEVICE FOR CONTROLLING STARTING OF POWER GENERATION SYSTEM

(71) Applicant: Nissan Motor Co., Ltd., Yokohama (JP)

(72) Inventors: Yoshihiro Terai, Kanagawa (JP); Tsukasa Ichiba, Kanagawa (JP); Kensaku Endo, Kanagawa (JP); Yoshihiro Kondo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/850,150

(22) PCT Filed: Apr. 1, 2022

(86) PCT No.: PCT/JP2022/017012
§ 371 (c)(1),
(2) Date: Sep. 24, 2024

(87) PCT Pub. No.: WO2023/188438
PCT Pub. Date: Oct. 5, 2023

(51) Int. Cl.
*B60W 10/08* (2006.01)
*B60W 20/00* (2016.01)

(52) U.S. Cl.
CPC ............ *B60W 10/08* (2013.01); *B60W 20/00* (2013.01); *B60W 2710/083* (2013.01)

(58) Field of Classification Search
None
See application file for complete search history.

(56) References Cited

U.S. PATENT DOCUMENTS

| 2015/0329104 A1 | 11/2015 | Takamura et al. |
| 2016/0023648 A1 | 1/2016 | Yamamoto |

FOREIGN PATENT DOCUMENTS

| JP | 2010-064563 A | 3/2010 | |
| JP | 2014-128088 A | 7/2014 | |
| JP | 2016-022847 A | 2/2016 | |
| JP | 2021-124058 A | 8/2021 | |
| WO | 2013-122105 A1 | 8/2013 | |
| WO | WO-2014103571 A1 * | 7/2014 | ............... B60K 6/48 |

* cited by examiner

*Primary Examiner* — Peter D Nolan
*Assistant Examiner* — Michael F Whalen
(74) *Attorney, Agent, or Firm* — Young Basile Hanlon & MacFarlane, P.C.

(57) ABSTRACT

A power generation system includes an internal combustion engine, an electrical generator, and a power transmission mechanism. A method for controlling the system includes executing rotation speed control of driving the electrical generator by using electric power supplied from a battery, and matching a rotation speed of the electrical generator with a target rotation speed at the time of starting the power generation system. Output possible electric power of the battery and rotation speed of the electrical generator are acquired. A filtering process of reducing a component of a resonance frequency band of a spring-mass system including the engine, generator, and power transmission mechanism is executed on the rotation speed of the electrical generator. An upper limit torque of the electrical generator is calculated based on the filtered rotation speed and the output possible electric power. The rotation speed control is executed under a limitation of the upper limit torque.

5 Claims, 8 Drawing Sheets

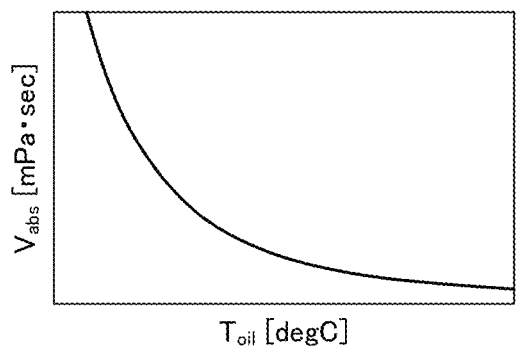
FIG. 5
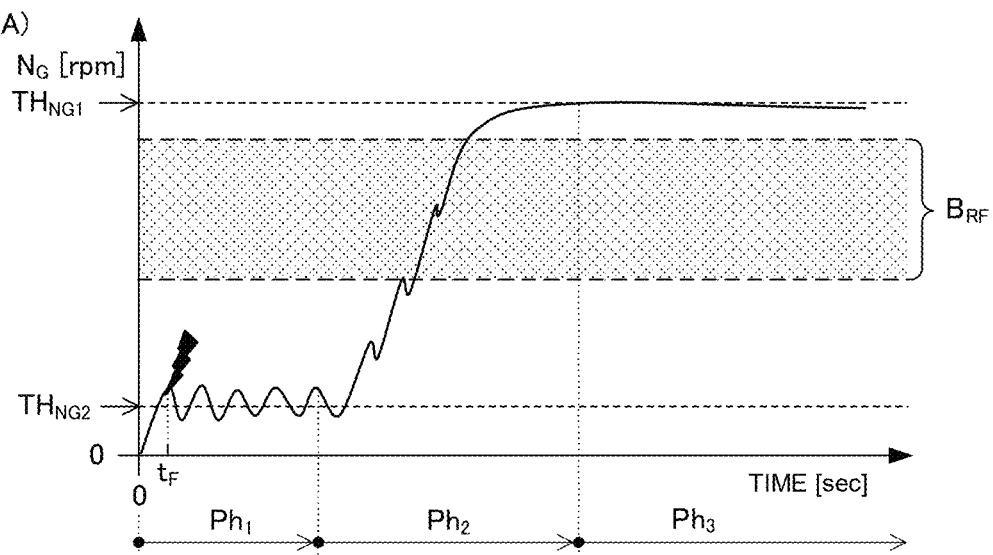
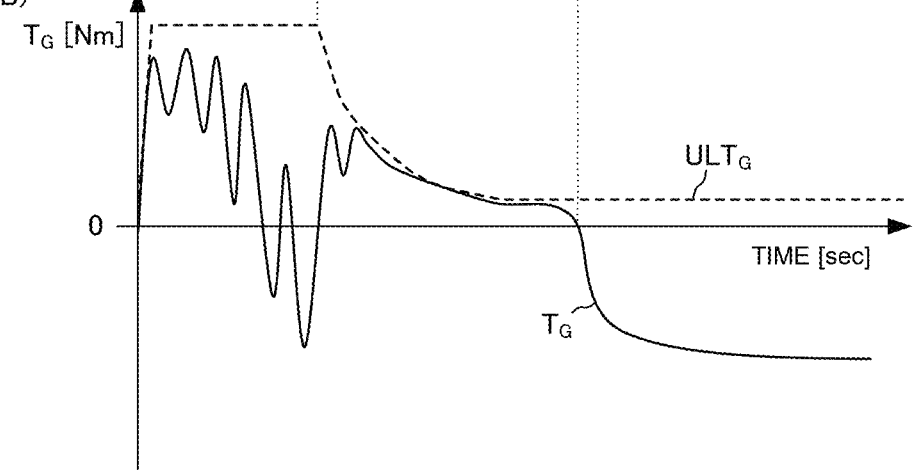

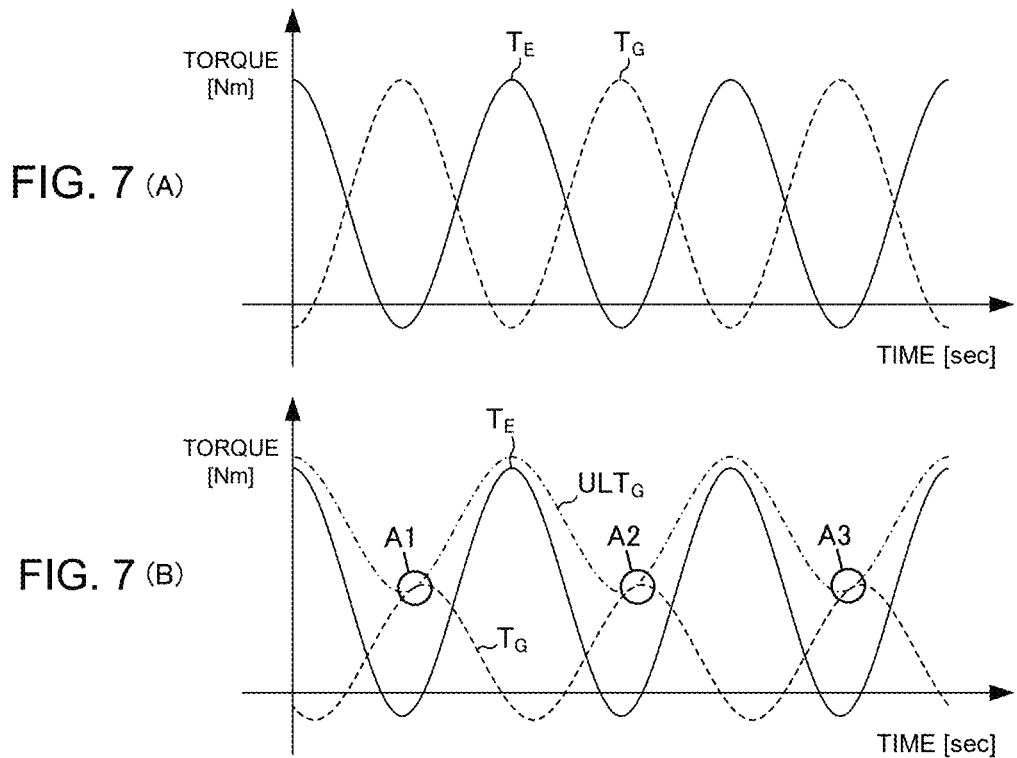
FIG. 7 (A)
FIG. 7 (B)
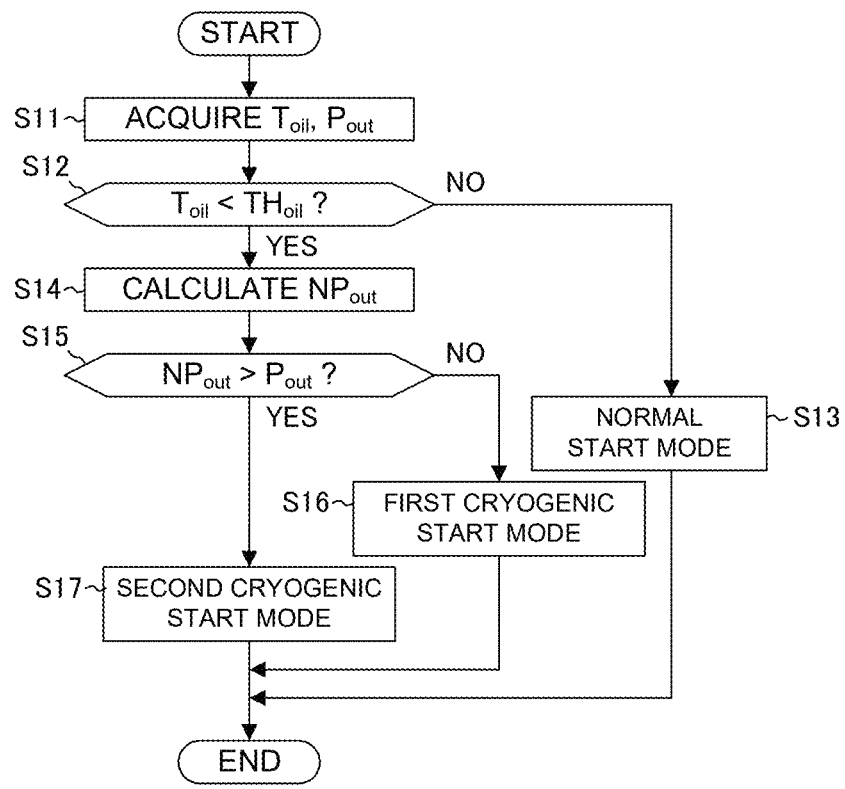
FIG. 8

METHOD AND DEVICE FOR CONTROLLING STARTING OF POWER GENERATION SYSTEM

TECHNICAL FIELD

The present invention relates to a method and a device for controlling starting of a power generation system.

BACKGROUND

JP2021-124058A discloses an engine start control device that rotates an engine (an internal combustion engine), which is mounted in a vehicle as a drive force source, at the time of starting the engine by using a motor capable of controlling a rotation speed.

SUMMARY

In recent years, a vehicle may be equipped with a power generation system including an engine as a power source, an electrical generator, and a power transmission mechanism that transmits power between the engine and the electrical generator. When the power generation system mounted in the vehicle is started, the electrical generator may be driven by electric power supplied from a battery to rotate the engine idly (so-called motoring). For example, in a so-called series type hybrid vehicle, a control is usually performed to increase a rotation speed of an engine to a predetermined rotation speed, which is determined in advance, by motoring, and then ignite the engine to start electric power generation. Since the power generation system oscillates when a rotation speed of the electrical generator or the like is within a resonance frequency band of the power generation system, in order to reduce such oscillation, as described above, a starting method of rapidly increasing the rotation speed to a rotation speed larger than the resonance frequency band by the motoring is adopted.

However, when the electric power that can be output by the battery is insufficient with respect to electric power required for driving the electrical generator in the case of starting the power generation system, the rotation speed of the engine cannot be rapidly increased to a rotation speed required for starting the electric power generation by the motoring. In this case, there is a problem that a time during which the rotation speed of the electrical generator or the like stays in the resonance frequency band is long, and the oscillation of the power generation system is not reduced. Further, in a case in which the motoring at the time of starting is executed by a rotation speed control for matching the rotation speed of the electrical generator with a target rotation speed, fluctuation in the rotation speed of the electrical generator or the like is promoted, and the time during which the rotation speed stays in the resonance frequency band tends to be particularly long.

An object of the present invention is to provide a method for controlling starting of a power generation system and a device for controlling starting of a power generation system that can rapidly increase a rotation speed of an electrical generator or the like to a rotation speed exceeding a resonance frequency band by motoring even when electric power that can be output by a battery at the time of starting the power generation system is small.

One aspect of the present invention relates to a method for controlling starting of a power generation system including an internal combustion engine as a power source, an electrical generator, and a power transmission mechanism that transmits power between the internal combustion engine and the electrical generator, the method executes a rotation speed control of driving the electrical generator by using electric power supplied from a battery, and matching a rotation speed of the electrical generator with a target rotation speed at the time of starting the power generation system. According to the method for controlling starting of a power generation system, output possible electric power of the battery is acquired, and the rotation speed of the electrical generator is acquired. A filtering process of reducing a component of a resonance frequency band of a spring-mass system including the internal combustion engine, the electrical generator, and the power transmission mechanism is executed on the rotation speed of the electrical generator. Further, an upper limit torque that is an upper limit value of a torque of the electrical generator is calculated based on the filtered rotation speed of the electrical generator and the output possible electric power of the battery. In addition, the rotation speed control is executed under a limitation of the upper limit torque.

BRIEF DESCRIPTION OF THE DRAWINGS

FIG. 5 is a graph showing a relation between an engine oil temperature and an absolute viscosity of an engine oil;

FIGS. 6a and 6b are explanatory diagrams showing a change in the electrical generator rotation speed, the ignition timing of the engine, and a change in an electrical generator torque in a second cryogenic start mode;

FIGS. 7a and 7b are explanatory diagrams showing an engine torque and an electrical generator torque when a rotation speed control is performed in the second cryogenic start mode;

FIG. 8 is a flowchart related to selection of the start mode;

DETAILED DESCRIPTION

Hereinafter, an embodiment of the present invention will be described with reference to the accompanying drawings.

Figure 1:
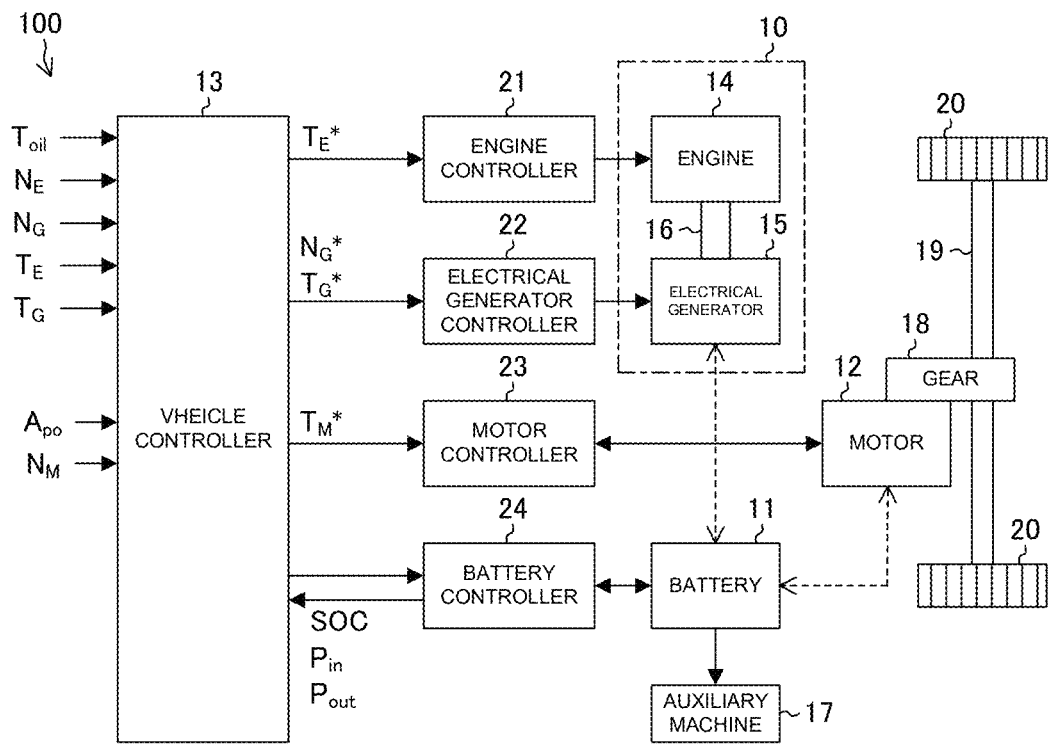
FIG. 1 is a block diagram showing a configuration of a vehicle in which a power generation system is mounted.

FIG. 1 is a block diagram showing a configuration of a vehicle 100 in which a power generation system 10 is mounted. As shown in FIG. 1, the vehicle 100 according to the present embodiment is a series type hybrid vehicle including the power generation system 10, a battery 11, a motor 12, and a vehicle controller 13 that integrally controls the power generation system 10, the battery 11, and the motor 12. That is, the vehicle 100 charges the battery 11 by using electric power generated by the power generation system 10. The vehicle 100 travels by using the electric power of the battery 11 to drive the motor 12 used for driving. However, the present invention can also be suitably applied in another type of hybrid vehicle as long as this vehicle is equipped with the power generation system 10. Further, the present invention can also be applied in a power generation system other than the power generation system 10 mounted in the vehicle 100.

The power generation system 10 includes an engine 14, an electrical generator 15, and a power transmission mechanism 16.

The engine 14 is a so-called internal combustion engine, and functions as a power source of the power generation system 10. Various parameters representing an operating state of the engine 14, such as a rotation speed of the engine 14 (hereinafter, referred to as an engine rotation speed $N_E$), a torque thereof (hereinafter, referred to as an engine torque $T_E$), and a temperature of the engine 14, can be appropriately detected or acquired by a sensor (not shown), calculation, and the like. According to the present embodiment, a temperature of an engine oil (hereinafter, referred to as an engine oil temperature $T_{oil}$) is acquired as the temperature of the engine 14.

When the power generation system 10 generates electric power, the engine 14 is controlled such that the engine torque $T_E$ matches a target value (hereinafter, referred to as an engine torque target value $T_E^*$) in accordance with an electric power generation amount, electric power generation efficiency, and the like. In this manner, a control of matching a torque with a target torque is referred to as a torque control. The torque control of the engine 14 is implemented by, for example, a feedback control such as a proportional-integral control (PI control) based on an actual engine torque $T_E$ and the engine torque target value $T_E^*$.

Depending on an actual configuration of the vehicle 100, the engine 14 may serve as a power source for inputting power to the motor 12 used for driving instead of inputting the power to the electrical generator 15 and then driving the vehicle 100. In the present embodiment, for simplicity, the engine 14 is driven only when necessary for electric power generation, and the power thereof is input to the electrical generator 15.

The electrical generator 15 generates electric power by the power output from the engine 14, and charges the battery 11 by using the electric power. When the power generation system 10 is started, the electrical generator 15 is driven by using the electric power of the battery 11 to rotate the engine 14 idly (hereinafter, referred to as motoring). Various parameters representing an operating state of the electrical generator 15, such as a rotation speed of the electrical generator 15 (hereinafter, referred to as an electrical generator rotation speed $N_G$) and a torque thereof (hereinafter, referred to as an electrical generator torque $T_G$), can be appropriately detected or acquired by a sensor (not shown), calculation, and the like.

At least when the power generation system 10 generates electric power, the electrical generator 15 is controlled such that the electrical generator rotation speed $N_G$ matches a target value (hereinafter, simply referred to as a target rotation speed $N_G^*$) in accordance with the electric power generation amount, the electric power generation efficiency, and the like. Therefore, the engine rotation speed $N_E$ is determined based on the electrical generator rotation speed $N_G$ at the time of electric power generation. In this manner, a control of matching a rotation speed with a target rotation speed is referred to as a rotation speed control. In the present embodiment, in particular, the electrical generator 15 is also controlled by the rotation speed control when the power generation system 10 is started. The rotation speed control of the electrical generator 15 is implemented by, for example, a feedback control such as a PI control based on an actual electrical generator rotation speed $N_G$ and the target rotation speed $N_G^*$.

The power transmission mechanism 16 is a mechanical mechanism that connects the engine 14 and the electrical generator 15, and transmits power between the engine 14 and the electrical generator 15. The power transmission mechanism 16 is implemented by, for example, a damper, a speed reducer, a transmission, or a combination thereof. In any case, the power transmission mechanism 16 functions as a spring element, a damping element, or as the spring element and the damping element in relation to power transmission. Therefore, the engine 14, the electrical generator 15, and the power transmission mechanism 16 (that is, the power generation system 10) constitute a so-called spring-mass system, and have a specific resonance frequency ωp (not shown) in accordance with a specific configuration thereof. Therefore, when the engine rotation speed $N_E$ and the electrical generator rotation speed $N_G$ stay in the resonance frequency ωp or a frequency band in the vicinity thereof (hereinafter, referred to as a resonance frequency band $B_{RF}$), a large vibration may occur in the power generation system 10. Hereinafter, the resonance frequency Op and the resonance frequency band $B_{RF}$ of the spring-mass system constituted by the engine 14, the electrical generator 15, and the power transmission mechanism 16 are referred to as the resonance frequency Op of the power generation system 10 and the resonance frequency band $B_{RF}$ of the power generation system 10, respectively.

The battery 11 is a secondary battery and is chargeable. The battery 11 is typically a lithium-ion battery. The battery 11 supplies the electric power for driving the motor 12. When the power generation system 10 is started, the battery 11 supplies the electric power for driving the electrical generator 15. In principle, the battery 11 is charged by using the electric power generated by the power generation system 10. However, the battery 11 can also be charged by using electric power generated by the motor 12 due to a so-called regenerative control. The battery 11 also supplies electric power to an auxiliary machine 17. The auxiliary machine 17 is a device or the like that requires electric power, and is, for example, a light, a speaker, a car navigation device, an air conditioner, or the like of the vehicle 100.

Various parameters representing a state of the battery 11, such as a state of charge (SOC), a temperature, output possible electric power $P_{out}$, and input possible electric power $P_{in}$ of the battery 11, can be appropriately detected or acquired by a sensor (not shown), calculation, and the like. The SOC is a parameter serving as an index of a charged state (a charge amount) of the battery 11.

The motor 12 is an electric motor used for driving, and generates a drive force in the vehicle 100 by a torque to be output. The motor 12 is connected to drive wheels 20 via a gear 18 and a drive shaft 19. Therefore, the torque output from the motor 12 generates the drive force in the drive wheels 20. Various parameters representing an operating state of the motor 12, such as a rotation speed of the motor 12 (hereinafter, referred to as a motor rotation speed $N_M$) and a torque thereof (hereinafter, referred to as a motor torque $T_M$), can be appropriately detected or acquired by a sensor (not shown), calculation, and the like.

The vehicle controller 13 is a control device that integrally controls parts of the vehicle 100 by using an engine controller 21, an electrical generator controller 22, a motor controller 23, a battery controller 24, and the like. These controllers are implemented by one or a plurality of computers, and are programmed to control the parts of the vehicle 100 at a predetermined control cycle. These controllers may include a circuit, a sensor, and the like for controlling the parts of the vehicle 100 as necessary. In the present embodiment, for example, the electrical generator controller 22 includes an inverter that controls the electric power input to and output from the electrical generator 15.

Further, all or some of these controllers constitute a control device that controls a device, a system, or the like of a specific portion of the vehicle 100. For example, the vehicle controller 13, the engine controller 21, and the electrical generator controller 22 constitute a control device of the power generation system 10. In particular, the vehicle controller 13, the engine controller 21, and the electrical generator controller 22 constitute a start control device that performs a start control of the power generation system 10. Further, the vehicle controller 13 and the motor controller 23 constitute a drive control device that controls driving of the vehicle 100.

The vehicle controller 13 acquires the parameters representing the operating states of the parts constituting the vehicle 100, and controls the parts of the vehicle 100 by using the parameters.

Specifically, the vehicle controller 13 acquires the engine oil temperature $T_{oil}$, the engine rotation speed $N_E$, the electrical generator rotation speed $N_G$, the engine torque $T_E$, the electrical generator torque $T_G$, the SOC of the battery 11, the output possible electric power $P_{out}$ of the battery 11, the input possible electric power $P_{in}$ of the battery 11, and the like. Further, the vehicle controller 13 controls the start and the electric power generation of the power generation system 10 based on these parameters.

When the power generation system 10 generates electric power, the vehicle controller 13 calculates an electric power generation amount required for the power generation system 10 (hereinafter, referred to as a required electric power generation amount) based on the SOC of the battery 11 and the like. Further, the vehicle controller 13 calculates, based on the required electric power generation amount, the engine torque target value $T_E^*$ and the target rotation speed $N_G^*$ for achieving the required electric power generation amount, inputs the engine torque target value $T_E^*$ to the engine controller 21, and inputs the target rotation speed $N_G^*$ to the electrical generator controller 22. Accordingly, the engine controller 21 performs the torque control on the engine 14 such that the engine torque $T_E$ matches the engine torque target value $T_E^*$, and the electrical generator controller 22 performs the rotation speed control on the electrical generator 15 such that the electrical generator rotation speed $N_G$ matches the target rotation speed $N_G^*$. Accordingly, the power generation system 10 generates electric power in accordance with the required electric power generation amount and charges the battery 11.

In a case in which the electric power generation is started when the power generation system 10 is in a stopped state, the vehicle controller 13 executes a start control of starting the power generation system 10 prior to the above electric power generation control. In the start control, the vehicle controller 13 sets the target rotation speed $N_G^*$ to a predetermined value set in advance according to the resonance frequency band $B_{RF}$, and inputs the predetermined value to the electrical generator controller 22. Then, the electrical generator controller 22 performs the rotation speed control such that the electrical generator rotation speed $N_G$ matches the target rotation speed $N_G^*$ that is a predetermined value set in advance. Accordingly, the engine 14 is motored. Thereafter, the vehicle controller 13 ignites the engine 14 by providing ignition permission of the engine 14 to the engine controller 21, and shifts a control sequence of the power generation system 10 from the start control to the electric power generation control.

When the start control is executed, the vehicle controller 13 sets an upper limit value (hereinafter, referred to as an upper limit torque $ULT_G$) of the torque of the electrical generator 15 based on the electrical generator rotation speed $N_G$ and the output possible electric power $P_{out}$ of the battery 11. Then, the vehicle controller 13 sets, for the electrical generator 15, a torque target value (hereinafter, referred to as an electrical generator torque target value $T_G^*$) set within a range of the upper limit torque $ULT_G$. Therefore, the rotation speed control of the electrical generator 15 in the start control is executed under a limitation of the upper limit torque $ULT_G$ such that the electrical generator torque $T_G$ does not exceed the upper limit torque $ULT_G$. In the present embodiment, in particular, the vehicle controller 13 may calculate and use an upper limit torque $ULT_{G\text{-}flt}$ that is subjected to a filtering process according to the resonance frequency band $B_{RF}$ (the resonance frequency $\omega_p$) of the power generation system 10. The start control of the power generation system 10, in particular, the start control to be performed under a limitation of the upper limit torque $ULT_{G\text{-}flt}$ that is subjected to the filtering process to reduce a component of the resonance frequency band $B_{RF}$ will be described in detail later.

Further, the vehicle controller 13 controls the driving of the vehicle 100 based on an accelerator position (an accelerator opening degree) $A_{po}$, the motor rotation speed $N_M$, and the like. Specifically, the vehicle controller 13 calculates a motor torque target value $T_M^*$, which is a target value of the torque to be output by the motor 12, based on the accelerator position $A_{po}$, the motor rotation speed $N_M$, and the like, and inputs the motor torque target value $T_M^*$ to the motor controller 23. The motor controller 23 performs a torque control to match the output torque of the motor 12 with the motor torque target value $T_M^*$. Accordingly, the vehicle 100 is driven by a drive force requested by the accelerator position $A_{po}$. The accelerator position $A_{po}$ is a parameter representing an operation amount of an accelerator pedal (not shown), and is appropriately detected by a sensor (not shown) and the like.

The battery controller 24 controls the input and output of the electric power of the battery 11 in response to a request from the vehicle controller 13 or the like. Further, the battery controller 24 measures the SOC, the output possible electric power $P_{out}$, the input possible electric power $P_{in}$, and the like of the battery 11, and inputs these measured values to the vehicle controller 13.

Hereinafter, among various controls described above, the start control of the power generation system 10 will be described in detail.

[Start Control of Power Generation System]

Figure 2:
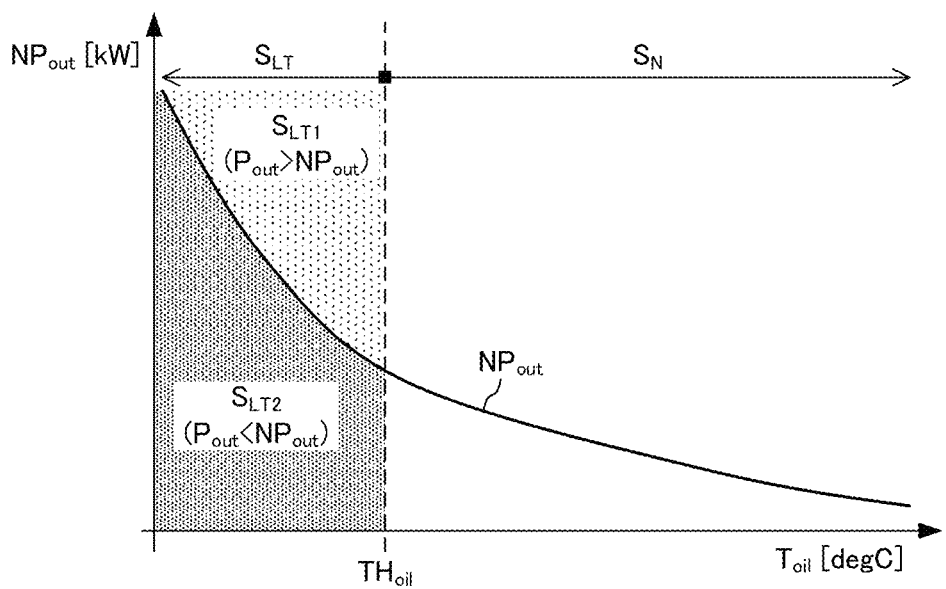
FIG. 2 is an explanatory diagram showing a start mode of the power generation system in accordance with a temperature of an engine and output possible electric power of a battery.

FIG. 2 is an explanatory diagram showing a start mode of the power generation system 10 in accordance with the temperature (the engine oil temperature $T_{oil}$) of the engine 14 and the output possible electric power $P_{out}$ of the battery 11. As shown in FIG. 2, the start mode of the power generation system 10 includes a normal start mode $S_N$ and a cryogenic start mode $S_{LT}$.

The normal start mode $S_N$ refers to a start mode that is selected when the temperature of the engine 14, that is, the engine oil temperature $T_{oil}$ is higher than a predetermined temperature $TH_{oil}$ determined in advance. Further, the normal start mode $S_N$ refers to a start mode in which the engine 14 is ignited after the electrical generator rotation speed $N_G$ (and the engine rotation speed $N_E$) is motored to become higher than the resonance frequency band $B_{RF}$ of the power generation system 10 and reach a predetermined rotation speed $TH_{NGn}$ at which sound vibration is also less likely to generate in a portion other than the power generation system 10. A frequency band (a rotation speed band) in which the sound vibration occurs in a portion other than the power generation system 10 is usually a frequency band higher than the resonance frequency band $B_{RF}$ of the power generation system 10.

The cryogenic start mode $S_{LT}$ refers to a start mode that is selected when the engine oil temperature $T_{oil}$ is equal to or lower than the predetermined temperature $TH_{oil}$. The word "cryogenic" refers to a temperature in a case in which the engine oil temperature $T_{oil}$ is equal to or lower than the predetermined temperature $TH_{oil}$.

Further, the cryogenic start mode $S_{LT}$ includes a first cryogenic start mode $S_{LT1}$ and a second cryogenic start mode $S_{LT2}$. One of the first cryogenic start mode $S_{LT1}$ and the second cryogenic start mode $S_{LT2}$ is selected according to a relation between output possible electric power of the battery 11 required for driving the electrical generator 15 (hereinafter referred to as a required electric power $NP_{out}$) and the actual output possible electric power $P_{out}$ of the battery 11 in the start control.

The first cryogenic start mode $S_{LT1}$ is selected when the output possible electric power $P_{out}$ of the battery 11 is equal to or larger than the required electric power $NP_{out}$. The first cryogenic start mode $S_{LT1}$ refers to a start mode in which the engine 14 is ignited after the electrical generator rotation speed $N_G$ (and the engine rotation speed $N_E$) is motored to a predetermined rotation speed $TH_{NG1}$ higher than the resonance frequency band $B_{RF}$ of the power generation system 10 by the electric power of the battery 11. The predetermined rotation speed $TH_{NG1}$ in the first cryogenic start mode $S_{LT1}$ is set within a range in which the sound vibration is generated in a portion other than the power generation system 10. That is, $TH_{NGn} > TH_{NG1}$, and as compared with the normal start mode $S_N$, the first cryogenic start mode $S_{LT1}$ refers to a start mode in which the power generation system 10 is started while ignoring a sound vibration reduction request with respect to a portion other than the power generation system 10.

The second cryogenic start mode $S_{LT2}$ is selected when the output possible electric power $P_{out}$ of the battery 11 is smaller than the required electric power $NP_{out}$. That is, the second cryogenic start mode $S_{LT2}$ is selected when the electric power of the battery 11 is insufficient and the electrical generator rotation speed $N_G$ (and the engine rotation speed $N_E$) cannot be motored to a rotation speed higher than the resonance frequency band $B_{RF}$ of the power generation system 10 by the electric power of the battery 11. Alternatively, the second cryogenic start mode $S_{LT2}$ is selected in a case in which a long time is required even if the electrical generator rotation speed $N_G$ (and the engine rotation speed $N_E$) can be motored to the target rotation speed $N_G^*$ higher than the resonance frequency band $B_{RF}$. Further, in the second cryogenic start mode $S_{LT2}$, the engine 14 is ignited in a state in which the electrical generator rotation speed $N_G$ (and the engine rotation speed $N_E$) is motored to a predetermined rotation speed $TH_{NG2}$ lower than the resonance frequency band $B_{RF}$. Therefore, the second cryogenic start mode $S_{LT2}$ refers to a "low-rotation speed start mode" that is in a cryogenic temperature and in which the electrical generator rotation speed $N_G$ (and the engine rotation speed $N_E$) is motored to the predetermined rotation speed $TH_{NG2}$ lower than the resonance frequency band $B_{RF}$.

Figure 3:
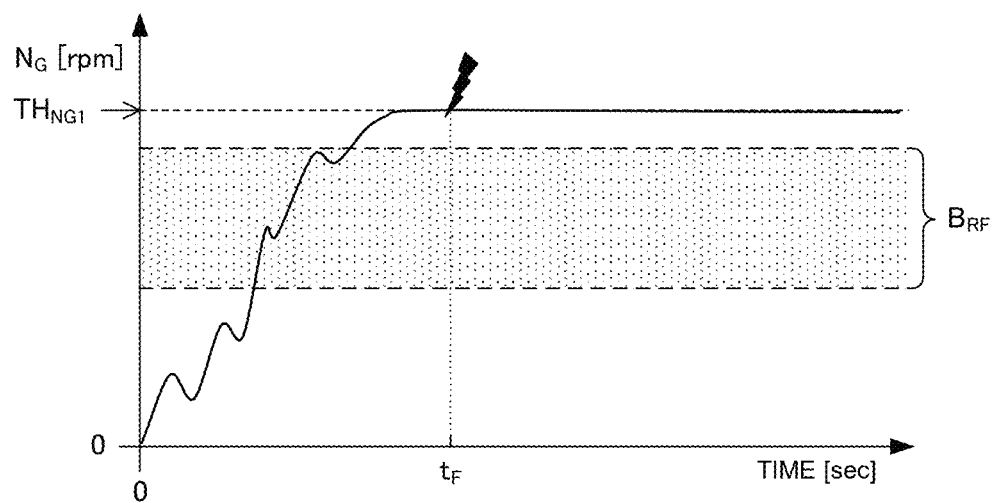
FIG. 3 is an explanatory diagram showing a change in an electrical generator rotation speed and an ignition timing of the engine in a first cryogenic start mode.

FIG. 3 is an explanatory diagram showing a change in the electrical generator rotation speed $N_G$ and an ignition timing $t_F$ of the engine 14 in the first cryogenic start mode $S_{LT1}$. In a scene in which the first cryogenic start mode $S_{LT1}$ is selected, the battery 11 can supply sufficient electric power that satisfies the required electric power $NP_{out}$ even in a cryogenic environment. Therefore, as shown in FIG. 3, the electrical generator rotation speed $N_G$ is motored to pass through the resonance frequency band $B_{RF}$ as rapidly as possible from the start of the power generation system 10 to the predetermined rotation speed $TH_{NG1}$ exceeding the resonance frequency band $B_{RF}$, and then the engine 14 is ignited.

However, in the cryogenic environment, normally, the output possible electric power $P_{out}$ of the battery 11 decreases and the viscosity of the engine oil temperature $T_{oil}$ increases, and thus the battery 11 may not satisfy the required electric power $NP_{out}$.

Figure 4:
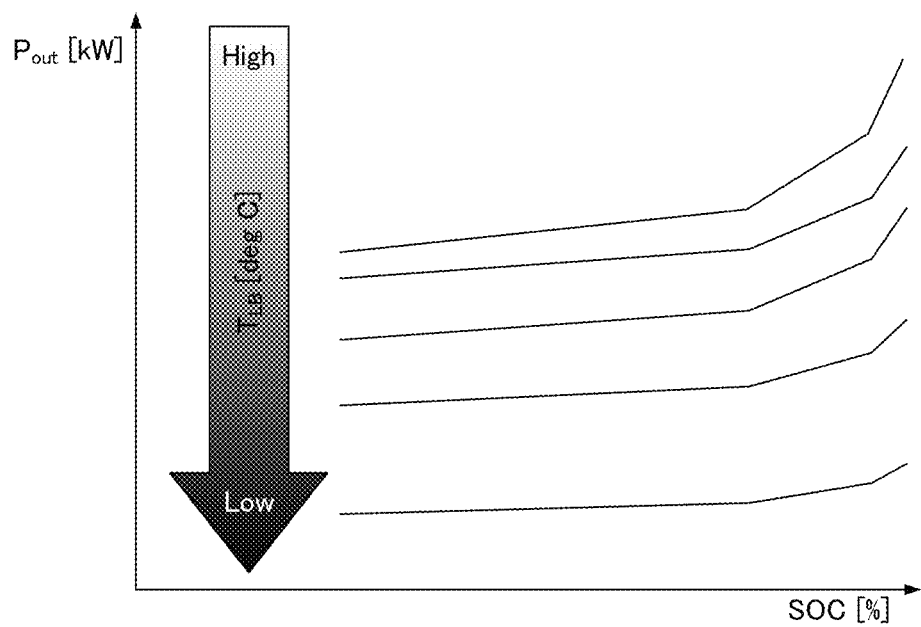
FIG. 4 is an explanatory diagram showing relations between an SOC, a temperature, and the output possible electric power of the battery.

FIG. 4 is an explanatory diagram showing relations between the SOC, a temperature $T_{LB}$, and the output possible electric power $P_{out}$ of the battery 11. As shown in FIG. 4, even in a case in which the SOC of the battery 11 is high, the output possible electric power $P_{out}$ decreases when the temperature of the battery 11 is low. Therefore, in the cryogenic environment, a performance of the battery 11 may be particularly degraded, and the output possible electric power $P_{out}$ may decrease to such an extent that the required electric power $NP_{out}$ is not satisfied.

FIG. 5 is a graph showing a relation between the engine oil temperature $T_{oil}$ and an absolute viscosity $V_{abs}$ of the engine oil. As shown in FIG. 5, when the engine oil temperature $T_{oil}$ decreases, the absolute viscosity $V_{abs}$ of the engine oil increases in an exponential manner. Therefore, in the cryogenic environment, frictional resistance of the engine 14 may be extremely increased. In the cryogenic environment, the engine 14 needs to be motored against such frictional resistance, and thus the required electric power $NP_{out}$ also increases in an exponential manner as the engine oil temperature $T_{oil}$ decreases (see FIG. 2). Further, when the battery 11 cannot supply the required electric power $NP_{out}$ in the cryogenic environment, low-rotation speed start in the second cryogenic start mode $S_{LT2}$ is required.

FIGS. 6a and 6b are explanatory diagrams showing a change in the electrical generator rotation speed $N_G$, the ignition timing $t_F$ of the engine 14, and a change in the electrical generator torque $T_G$ in the second cryogenic start mode $S_{LT2}$. FIG. 6a shows the change in the electrical generator rotation speed $N_G$ and the ignition timing $t_F$ of the engine 14 in the second cryogenic start mode $S_{LT2}$. Further, FIG. 6b shows the change in the electrical generator torque $T_G$ in the second cryogenic start mode $S_{LT2}$.

As shown in FIGS. 6a and 6b, the second cryogenic start mode $S_{LT2}$ includes control stages, that is, a first stage $Ph_1$, a second stage $Ph_2$, and a third stage $Ph_3$.

The first stage $Ph_1$ refers to a control stage in which the electrical generator rotation speed $N_G$ is motored to the predetermined rotation speed $TH_{NG2}$ lower the resonance frequency band $B_{RF}$, and the engine 14 is ignited. In this first stage $Ph_1$, the start (driving) of the engine 14 is assisted by the motoring so that the engine 14 can output the engine torque $T_E$ in a low-rotation speed state of the predetermined rotation speed $TH_{NG2}$.

The second stage $Ph_2$ refers to a control stage in which the electrical generator rotation speed $N_G$ exceeds the resonance frequency band $B_{RF}$ as rapidly as possible due to cooperation of the motoring by the electrical generator 15 and the engine torque $T_E$ (a compression reaction force) generated by the combustion of the engine 14. In the present embodiment, in the second stage $Ph_2$, the electrical generator rotation speed $N_G$ and the engine rotation speed $N_E$ are increased to the predetermined rotation speed $TH_{NG1}$ that is reached in the first cryogenic start mode $S_{LT1}$.

The third stage $Ph_3$ refers to a control stage in which the control sequence is shifted from the start control in the second cryogenic start mode $S_{LT2}$ to the normal electric power generation control.

The broken line in FIG. 6b schematically shows a general change in the upper limit torque $ULT_G$ with respect to the electrical generator torque $T_G$. The upper limit torque $ULT_G$ is calculated according to the following equation (1) by using the output possible electric power $P_{out}$ of the battery 11, the electrical generator rotation speed $N_G$, and a predetermined conversion coefficient C determined in advance. That is, the upper limit torque $ULT_G$ represents the maximum electrical generator torque $T_G$ that can be output by the electrical generator 15 based on the output possible electric power $P_{out}$ of the battery 11.

[Formula 1]

$$ULT_G = C \cdot \frac{P_{out}}{N_G} \quad (1)$$

When the output possible electric power $P_{out}$ of the battery 11 is sufficiently large with respect to the required electric power $NP_{out}$, the upper limit torque $ULT_G$ is a value sufficiently larger than a range in which the electrical generator rotation speed $N_G$ fluctuates due to the rotation speed control. Therefore, in the first cryogenic start mode $S_{LT1}$ and the like, the electrical generator torque $T_G$ is hardly limited by the upper limit torque $ULT_G$. However, in a case in which the output possible electric power $P_{out}$ of the battery 11 is small, such as a scene in which the second cryogenic start mode $S_{LT2}$ is selected, the upper limit torque $ULT_G$ is also reduced accordingly, and thus the upper limit torque $ULT_G$ may approach the range in which the electrical generator rotation speed $N_G$ fluctuates due to the rotation speed control, and the electrical generator torque $T_G$ may be limited by the upper limit torque $ULT_G$.

In particular, the second stage $Ph_2$ refers to the control stage in which the electrical generator rotation speed $N_G$ and the engine rotation speed $N_E$ are increased, and thus the electrical generator rotation speed $N_G$, which is the denominator of equation (1), increases. Therefore, as shown in FIG. 6b, in particular, in the second stage $Ph_2$, the electrical generator torque $T_G$ and the upper limit torque $ULT_G$ may be particularly approach each other, and the electrical generator torque $T_G$ may be limited by the upper limit torque $ULT_G$. Further, the electrical generator torque $T_G$ limited by the upper limit torque $ULT_G$ is a response delay in the rotation speed control. Therefore, the fluctuation of the electrical generator rotation speed $N_G$ is promoted by performing the rotation speed control. As a result, the electrical generator rotation speed $N_G$ and the engine rotation speed $N_E$ stay in the resonance frequency band $B_{RF}$ and cannot rapidly pass through the resonance frequency band $B_{RF}$, and the second stage $Ph_2$ becomes longer. That is, when the electrical generator torque $T_G$ is limited by the upper limit torque $ULT_G$, the vibration is likely to occur in the power generation system 10.

FIGS. 7a and 7b are explanatory diagrams showing the engine torque $T_E$ and the electrical generator torque $T_G$ when the rotation speed control is performed in the second cryogenic start mode $S_{LT2}$. FIG. 7a shows ideal changes in the engine torque $T_E$ and the electrical generator torque $T_G$ when the rotation speed control is performed in the second cryogenic start mode $S_{LT2}$. As shown in FIG. 7a, the engine torque $T_E$ and the electrical generator torque $T_G$ have a predetermined phase difference determined by characteristics of the power transmission mechanism 16 and the like. FIG. 7b shows actual changes in the engine torque $T_E$ and the electrical generator torque $T_G$ when the rotation speed control is performed in the second cryogenic start mode $S_{LT2}$. As shown in FIG. 7b, the actual electrical generator torque $T_G$ fluctuates in a vibrating manner due to the rotation speed control. Further, the upper limit torque $ULT_G$ is calculated by using the electrical generator rotation speed $N_G$ that vibrates due to the rotation speed control, and thus the upper limit torque $ULT_G$ changes in a vibrating manner according to the change in the electrical generator rotation speed $N_G$. Therefore, when the upper limit torque $ULT_G$ and the electrical generator torque $T_G$ approach each other in the second cryogenic start mode $S_{LT2}$, the electrical generator torque $T_G$ intersects the upper limit torque $ULT_G$ and is limited by the upper limit torque $ULT_G$, for example, as indicated by A1 to A3 in FIG. 7b. Therefore, as described above, the fluctuation of the electrical generator rotation speed $N_G$ is promoted, the electrical generator rotation speed $N_G$ cannot rapidly pass through the resonance frequency band $B_{RF}$, and the vibration occurs in the power generation system 10.

Therefore, in the present embodiment, in the second cryogenic start mode $S_{LT2}$ (in particular, the second stage $Ph_2$), the upper limit torque $ULT_{G\text{-}flt}$ subjected to the filtering process so as to reduce the component of the resonance frequency band $B_{RF}$ (hereinafter, simply referred to as the upper limit torque $ULT_{G\text{-}flt}$) is used instead of the upper limit torque $ULT_G$ described above, and the rotation speed control of the electrical generator 15 is executed under the limitation of the upper limit torque $ULT_{G\text{-}flt}$. The upper limit torque $ULT_{G\text{-}flt}$ subjected to the filtering process is calculated according to the following equation (2).

[Formula 2]

$$ULT_{G\text{-}flt} = C \cdot \frac{P_{out}}{N_{G\text{-}flt}} \quad (2)$$

As shown in equation (2), the upper limit torque $ULT_{G\text{-}flt}$ is calculated by performing the filtering process on the electrical generator rotation speed $N_G$ instead of performing the filtering process on the upper limit torque $ULT_G$ calculated according to equation (1). That is, the vehicle controller 13 performs, on the electrical generator rotation speed $N_G$, the filtering process of reducing the component of the resonance frequency band $B_{RF}$ and then calculates an electrical generator rotation speed $N_{G\text{-}flt}$ subjected to the filtering process (hereinafter, simply referred to as the electrical generator rotation speed $N_{G\text{-}flt}$). Further, the vehicle controller 13 calculates the upper limit torque $ULT_{G\text{-}flt}$ based on the electrical generator rotation speed $N_{G\text{-}flt}$ and the output possible electric power $P_{out}$ of the battery 11.

Effects

Hereinafter, effects related to the start control of the power generation system 10 in the vehicle 100 configured as described above will be explained.

FIG. 8 is a flowchart related to the selection of the start mode. As shown in FIG. 8, in step S11, the vehicle controller 13 acquires the engine oil temperature $T_{oil}$, the output possible electric power $P_{out}$ of the battery 11, and the like. In step S12, the vehicle controller 13 determines whether the engine oil temperature $T_{oil}$ is lower than the predetermined temperature $TH_{oil}$. When the engine oil temperature $T_{oil}$ is equal to or higher than the predetermined temperature $TH_{oil}$, the process proceeds to step S13, and the vehicle controller 13 starts the power generation system 10 in the normal start mode $S_N$.

On the other hand, when it is determined in step S12 that the engine oil temperature $T_{oil}$ is lower than the predetermined temperature $TH_{oil}$, the process proceeds to step S14, and the vehicle controller 13 calculates the required electric power $NP_{out}$ based on the engine oil temperature $T_{oil}$. The vehicle controller 13 includes a map in advance in which the engine oil temperature $T_{oil}$ and the required electric power $NP_{out}$ are associated with each other by, for example, experiments, simulations, or the like. Therefore, the vehicle controller 13 calculates the required electric power $NP_{out}$ based on the engine oil temperature $T_{oil}$ by referring to this map.

In step S15, the vehicle controller 13 determines whether the calculated required electric power $NP_{out}$ is larger than the output possible electric power $P_{out}$ of the battery 11. When it is determined that the required electric power $NP_{out}$ is equal to or smaller than the output possible electric power $P_{out}$ of the battery 11 and the motoring can be sufficiently performed to exceed the resonance frequency band $B_{RF}$ by the electric power of the battery 11, the process proceeds to step S16. Then, in step S16, the vehicle controller 13 starts the power generation system 10 in the first cryogenic start mode $S_{LT1}$.

On the other hand, when it is determined in step S15 that the required electric power $NP_{out}$ is smaller than the output possible electric power $P_{out}$ of the battery 11 and the motoring cannot be sufficiently performed to exceed the resonance frequency band $B_{RF}$ by the electric power of the battery 11, the process proceeds to step S17. Then, in step S17, the vehicle controller 13 starts the power generation system 10 in the second cryogenic start mode $S_{LT2}$.

Figure 9:
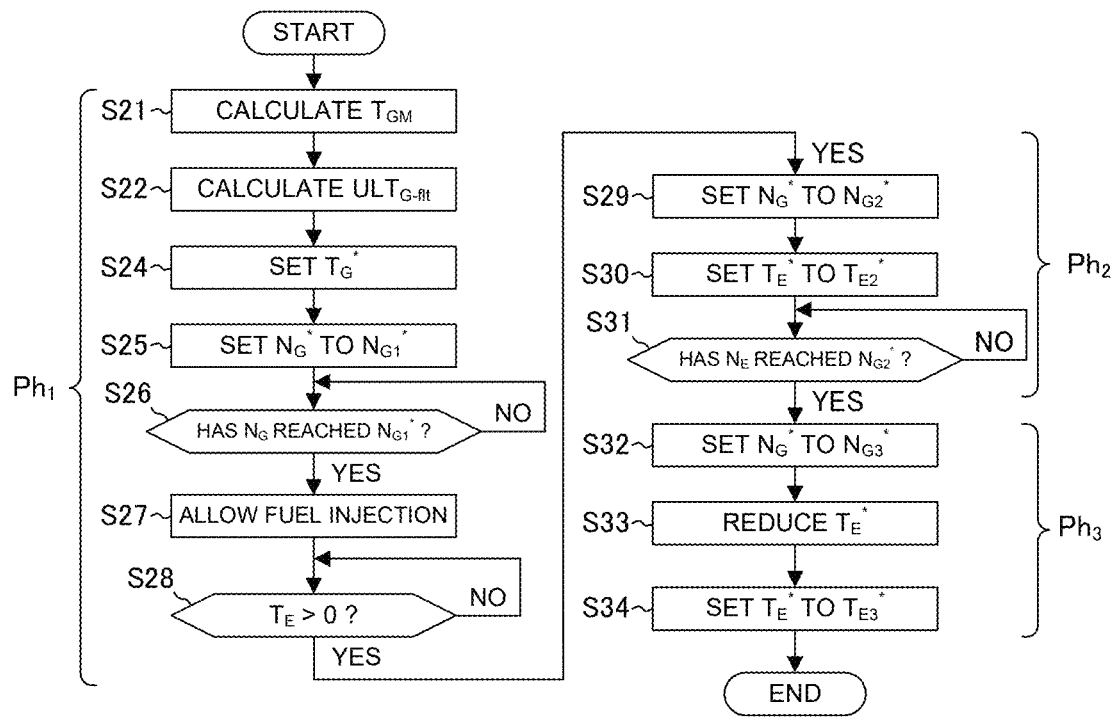
FIG. 9 is a flowchart of the rotation speed control in the second cryogenic start mode.

FIG. 9 is a flowchart of the rotation speed control in the second cryogenic start mode $S_{LT2}$. As shown in FIG. 9, in step S21, the vehicle controller 13 calculates, based on the output possible electric power $P_{out}$ of the battery 11, a maximum torque (hereinafter, referred to as a maximum power running torque $T_{GM}$) that can be output by the electrical generator 15 within a range of the output possible electric power $P_{out}$. In step S22, the vehicle controller 13 calculates the upper limit torque $ULT_{G\text{-}flt}$ based on the output possible electric power $P_{out}$ of the battery 11 and the electrical generator rotation speed $N_G$. That is, the vehicle controller 13 performs, on the acquired electrical generator rotation speed $N_G$, the filtering process of reducing the component of the resonance frequency band $B_{RF}$, calculates the electrical generator rotation speed $N_{G\text{-}flt}$, and calculates the upper limit torque $ULT_{G\text{-}flt}$ according to equation (2) by using the electrical generator rotation speed $N_{G\text{-}flt}$. Then, in step S24, the vehicle controller 13 sets, as the electrical generator torque target value $T_G^*$, a torque obtained by limiting the maximum power running torque $T_{GM}$ within the range of the upper limit torque $ULT_{G\text{-}flt}$. Further, in step S25, the vehicle controller 13 sets the target rotation speed $N_G^*$ to a first target rotation speed $N_{G1}^*$ lower than the resonance frequency band $B_{RF}$. In the present embodiment, the first target rotation speed $N_{G1}^*$ is the predetermined rotation speed $TH_{NG2}$ described above. In this manner, the vehicle controller 13 sets the electrical generator torque target value $T_G^*$ and the target rotation speed $N_G^*$, and thus the electrical generator controller 22 executes the rotation speed control such that the electrical generator rotation speed $N_G$ matches the first target rotation speed $N_{G1}^*$ in a range in which the electrical generator torque $T_G$ does not exceed the upper limit torque $ULT_{G\text{-}flt}$.

In step S26, the vehicle controller 13 determines whether the electrical generator rotation speed $N_G$ reaches the first target rotation speed $N_{G1}^*$. Further, when it is determined that the electrical generator rotation speed $N_G$ reaches the first target rotation speed $N_{G1}^*$, the vehicle controller 13 permits the engine 14 to inject fuel and starts the engine 14 in step S27. In step S27, the vehicle controller 13 sets the engine torque target value $T_E^*$ to an engine torque target value $T_{E1}^*$ used for starting (not shown). Then, in step S28, the vehicle controller 13 monitors the engine torque $T_E$ to determine whether the engine 14 stably outputs the engine torque $T_E$ by combustion, that is, whether $T_E>0$ is stably satisfied. The foregoing control refers to the control of the first stage $Ph_1$ in the second cryogenic start mode $S_{LT2}$. Then, when it is determined in step S28 that the engine torque $T_E$ is stably output, the vehicle controller 13 shifts to the control of the second stage $Ph_2$.

As shown in step S29, in the control of the second stage $Ph_2$, the vehicle controller 13 sets the target rotation speed $N_G^*$ to a second target rotation speed $N_{G2}^*$ at which the electrical generator rotation speed $N_G$ is increased to a rotation speed (for example, the predetermined rotation speed $TH_{NG1}$ described above) higher than the resonance frequency band $B_{RF}$. Further, in step S30, in order to rapidly pass through the resonance frequency band $B_{RF}$, the vehicle controller 13 sets the engine torque target value $T_E^*$ to an engine torque target value $T_{E2}^*$ for increasing the rotation speed in cooperation with the electrical generator 15. Accordingly, the electrical generator rotation speed $N_G$ and the engine rotation speed $N_E$ increase toward the second target rotation speed $N_{G2}^*$. Further, in step S31, the vehicle controller 13 determines whether the electrical generator rotation speed $N_G$ or the engine rotation speed $N_E$ reaches the second target rotation speed $N_{G2}^*$. In the present embodiment, the vehicle controller 13 monitors the engine rotation speed $N_E$ and determines whether the engine rotation speed $N_E$ reaches the second target rotation speed $N_{G2}^*$. The foregoing control refers to the control of the second stage $Ph_2$ in the second cryogenic start mode $S_{LT2}$. Further, when it is determined in step S31 that the engine rotation speed $N_E$ (or the electrical generator rotation speed $N_G$) reaches the second target rotation speed $N_{G2}^*$, the vehicle controller 13 executes the control of the third stage, that is, a shift control to the electric power generation control.

As shown in step S32, in the control of the third stage $Ph_3$, the vehicle controller 13 sets the target rotation speed $N_G^*$ to a third target rotation speed $N_{G3}^*$ that is a rotation speed suitable for the electric power generation control. Further, in step S33, the vehicle controller 13 decreases the engine torque target value $T_E^*$ stepwise. Then, in step S34, the vehicle controller 13 finally sets the engine torque target value $T_E^*$ to an engine torque target value $T_{E3}^*$ in accordance with the required electric power generation amount. Accordingly, the start control in the second cryogenic start mode $S_{LT2}$ ends, and the control sequence shifts to the normal electric power generation control.

Figure 10A:
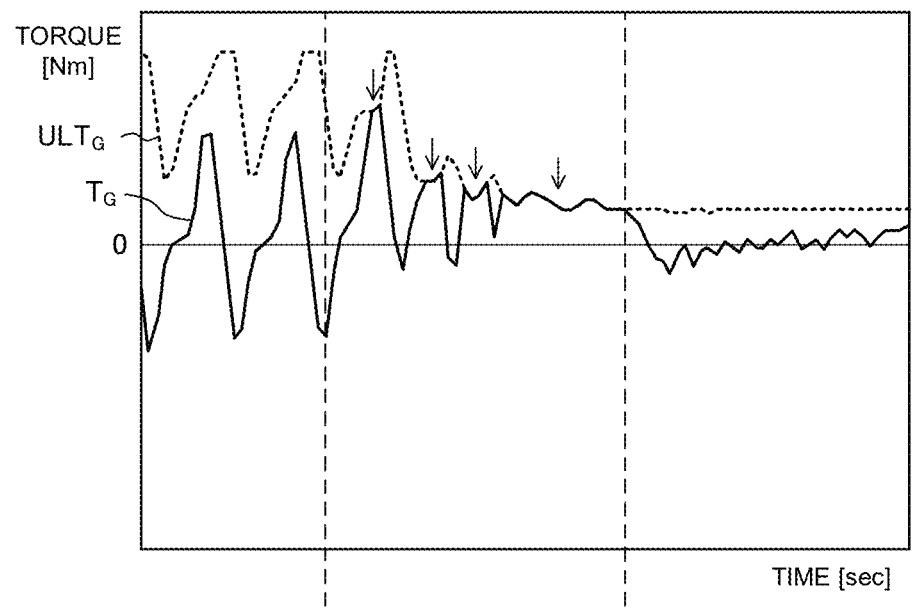
FIGS. 10a and 10b are graphs of a comparative example showing the torque and the rotation speed when a start control in the second cryogenic start mode is executed in a cryogenic environment by using an upper limit torque that is not subjected to a filtering process.
Figure 10B:
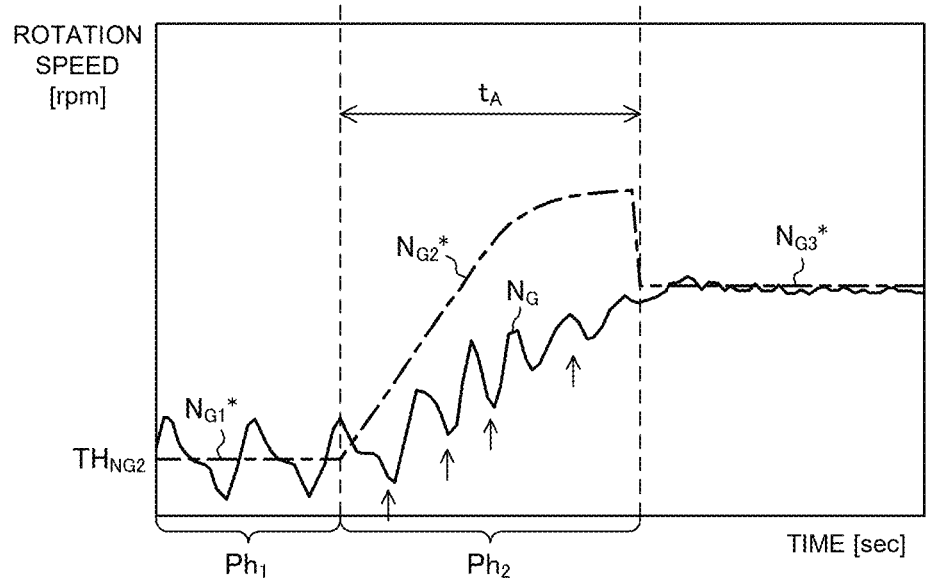

FIGS. 10a and 10b are graphs of a comparative example showing the torque and the rotation speed when the start control in the second cryogenic start mode $S_{LT2}$ is executed in the cryogenic environment by using the upper limit torque $ULT_G$ that is not subjected to the filtering process. FIG. 10a shows the electrical generator torque $T_G$ by a solid line, and shows the upper limit torque $ULT_G$ by a broken line. Further, FIG. 10b shows the electrical generator rotation speed $N_G$ by a solid line, and shows the target rotation speed $N_G^*$ by a dot-dashed line.

As shown in FIG. 10a, in the scene in which the second cryogenic start mode $S_{LT2}$ is selected, the upper limit torque $ULT_G$ is extremely close to the electrical generator torque $T_G$. Therefore, as indicated by downward arrows, the electrical generator torque $T_G$ is limited by the upper limit torque $ULT_G$ sometimes. Here, the electrical generator torque $T_G$ is limited four times by the upper limit torque $ULT_G$ in the second stage $Ph_2$. Further, as indicated by upward arrows in FIG. 10b, as the electrical generator torque $T_G$ is limited by the upper limit torque $ULT_G$, the vibration of the electrical generator rotation speed $N_G$ controlled in the rotation speed control is promoted. As a result, a time required for the second stage $Ph_2$ is set as a time $t_A$.

Figure 11A:
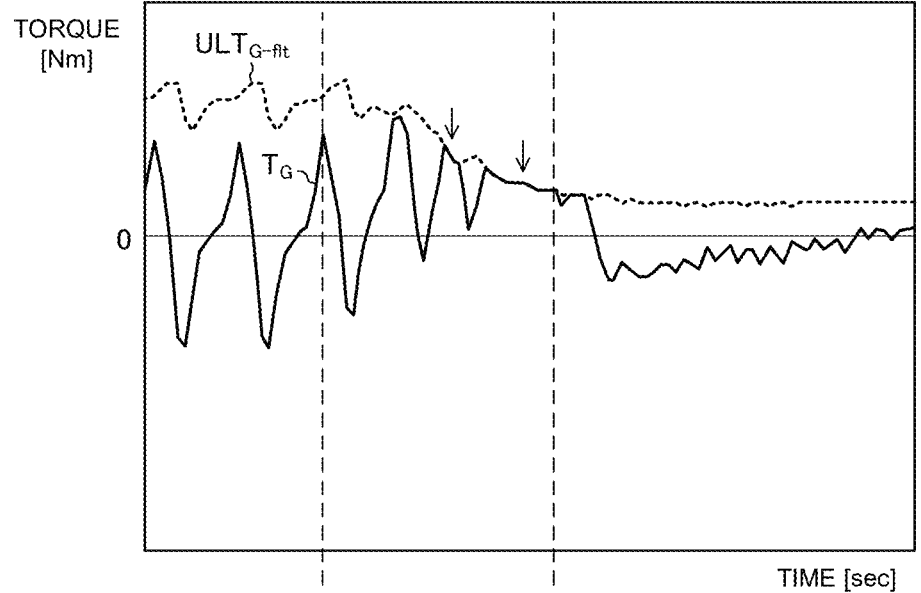
FIGS. 11a and 11b are graphs of an example showing the torque and the rotation speed when the power generation system is started in the second cryogenic start mode in the cryogenic environment.
Figure 11B:
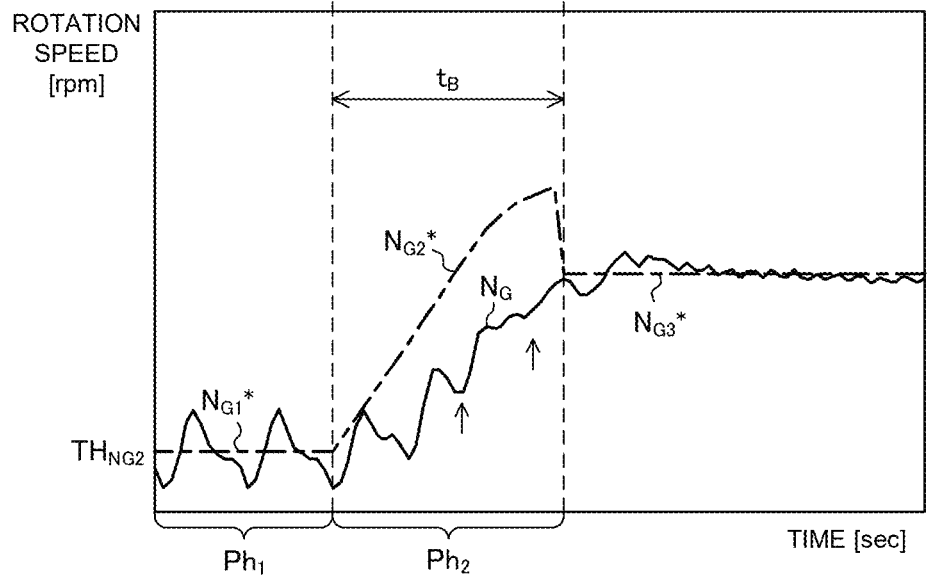

FIGS. 11a and 11b are graphs of an example showing the torque and the rotation speed when the start control in the second cryogenic start mode $S_{LT2}$ is executed in the cryogenic environment by using the upper limit torque $ULT_{G\text{-}flt}$ that is subjected to the filtering process. FIG. 11a shows the electrical generator torque $T_G$ by a solid line, and shows the upper limit torque $ULT_G$ flt by a broken line. Further, FIG. 11b shows the electrical generator rotation speed $N_G$ by a solid line, and shows the target rotation speed $N_G^*$ by a dot-dashed line.

As indicated by downward arrows in FIG. 11a, the electrical generator torque $T_G$ is also limited by the upper limit torque $ULT_{G\text{-}flt}$ sometimes in the case of using the upper limit torque $ULT_{G\text{-}flt}$ that is subjected to the filtering process. Here, the electrical generator torque $T_G$ is limited twice by the upper limit torque $ULT_G$ in the second stage $Ph_2$. However, as indicated by upward arrows in FIG. 11b, when the upper limit torque $ULT_{G\text{-}flt}$ subjected to the filtering process is used, the vibration of the electrical generator rotation speed $N_G$ controlled in the rotation speed control is reduced even when the electrical generator torque $T_G$ is limited by the upper limit torque $ULT_G$-flt. As a result, the time required for the second stage $Ph_2$ is set as a time $t_B$ shorter than the time $t_A$ in the case of using the upper limit torque $ULT_G$ that is not subjected to the filtering process.

As described above, in the second cryogenic start mode $S_{LT2}$ using the upper limit torque $ULT_{G\text{-}flt}$ subjected to the filtering process, even when the output possible electric power $P_{out}$ of the battery 11 is insufficient in the cryogenic environment and the resonance frequency band $B_{RF}$ of the power generation system 10 cannot be rapidly passed through by the simple motoring, the resonance frequency band $B_{RF}$ can be rapidly passed through. As a result, the vibration occurred in the power generation system 10 is reduced or restrained.

Further, when the electrical generator rotation speed $N_G$ and the engine rotation speed $N_E$ stay in the resonance frequency band $B_{RF}$ of the power generation system 10, a phase difference between the electrical generator rotation speed $N_G$ and the engine rotation speed $N_E$ may increase and may exceed an allowable limit of a damper or the like constituting the power transmission mechanism 16. However, as described above, in the second cryogenic start mode $S_{LT2}$ using the upper limit torque $ULT_{G\text{-}flt}$ subjected to the filtering process, the resonance frequency band $B_{RF}$ can be rapidly passed through, and thus occurrence of such a failure is also reduced or restrained.

Modifications

Hereinafter, a modification related to the start control in the second cryogenic start mode $S_{LT2}$ according to the above embodiment will be described.

In the above embodiment, the upper limit torque $ULT_{G\text{-}flt}$, which is subjected to the filtering process so as to reduce the component of the resonance frequency band $B_{RF}$, is used in the rotation speed control of the electrical generator 15, but when the upper limit torque $ULT_{G\text{-}flt}$ subjected to the filtering process is used in this manner, actual electric power consumption of the electrical generator 15 may exceed the output possible electric power $P_{out}$ of the battery 11.

Figure 12:
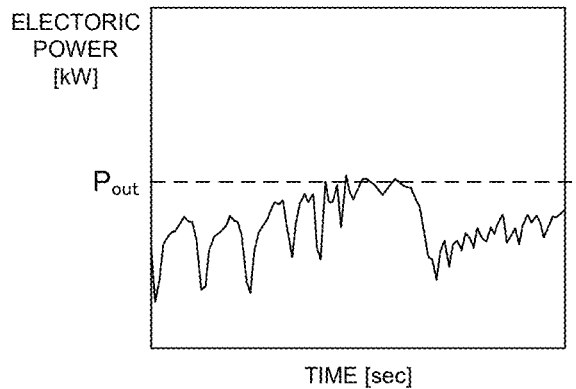
FIGS. 12a and 12b are graphs showing the output possible electric power of the battery and actual electric power consumption of the electrical generator.
Figure 12:
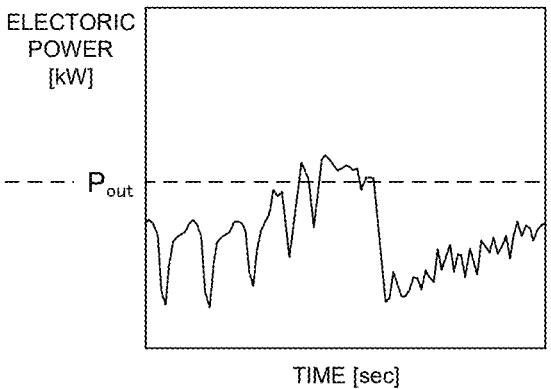

FIGS. 12a and 12b are graphs showing the output possible electric power $P_{out}$ of the battery 11 and the actual electric power consumption of the electrical generator 15. FIG. 12a shows a change in the electric power consumption of the electrical generator 15 in the case of using the upper limit torque $ULT_G$ that is not subjected to the filtering process. FIG. 12b shows a change in the electric power consumption of the electrical generator 15 in the case of using the upper limit torque $ULT_{G\text{-}flt}$ that is subjected to the filtering process.

As shown in FIG. 12a, when the upper limit torque $ULT_G$, which is not subjected to the filtering process, is used in the rotation speed control of the electrical generator 15, the electric power consumption of the electrical generator 15 substantially transitions in a range of the output possible electric power $P_{out}$ of the battery 11 or less, and even if the electric power consumption exceeds the output possible electric power $P_{out}$ of the battery 11, a time thereof is negligible and is extremely short. On the other hand, as shown in FIG. 12b, when the upper limit torque $ULT_{G\text{-}flt}$, which is subjected to the filtering process, is used in the rotation speed control of the electrical generator 15, the electric power consumption of the electrical generator 15 significantly exceeds the output possible electric power $P_{out}$ of the battery 11 sometimes. For example, when the change in the electrical generator rotation speed $N_G$ is steep, or when the output possible electric power $P_{out}$ suddenly changes due to an abnormality in the battery 11 or the like, the electric power consumption of the electrical generator 15 may exceed the output possible electric power $P_{out}$ of the battery 11. When the electric power consumption of the electrical generator 15 exceeds the output possible electric power $P_{out}$ of the battery 11, the battery 11 is deteriorated or damaged. Further, the supply of the electric power from the battery 11 may be interrupted by a relay circuit (not shown) in some cases.

Therefore, it is desirable to set a predetermined margin 8M determined in advance with respect to the output possible electric power $P_{out}$ of the battery 11 and calculate the upper limit torque $ULT_{G\text{-}flt}$ as shown in the following equation (3).

[Formula 3]

$$ULT_{G\text{-}flt} = C \cdot \frac{(P_{out} - \delta_m)}{N_{G\text{-}flt}} \quad (3)$$

In this way, by setting the margin $\delta_M$ with respect to the output possible electric power $P_{out}$ of the battery 11, it is possible to more reliably restrain the electric power consumption of the electrical generator 15 into the range of the output possible electric power $P_{out}$ of the battery 11 or less. That is, by setting the margin OM with respect to the output possible electric power $P_{out}$ of the battery 11, the start control in the second cryogenic start mode $S_{LT2}$ can rapidly pass through the resonance frequency band $B_{RF}$ while ensuring safety.

Figure 13:
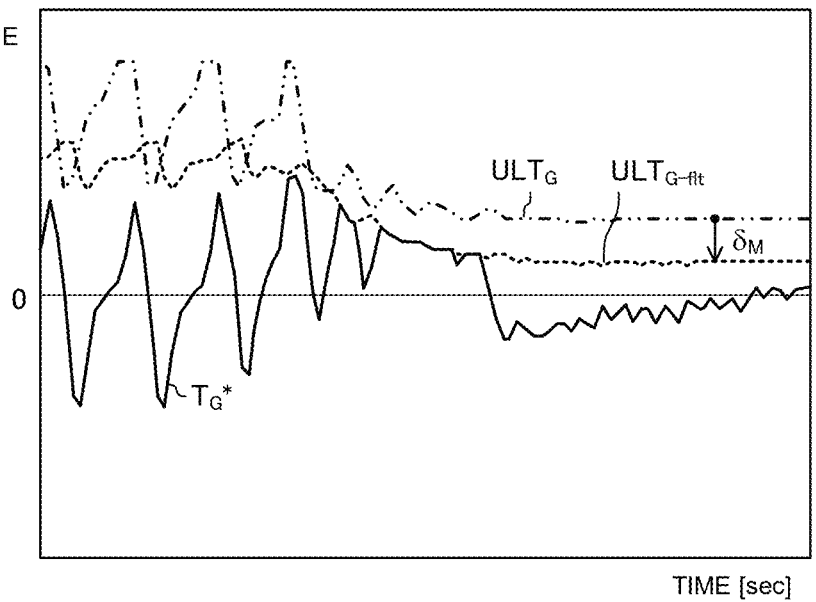
FIG. 13 is an explanatory diagram showing an effect of a margin set with respect to the output possible electric power of the battery.

FIG. 13 is an explanatory diagram showing an effect of the margin OM set with respect to the output possible electric power $P_{out}$ of the battery 11. As shown in FIG. 13, the upper limit torque $ULT_{G\text{-}flt}$ calculated by setting the margin $\delta_M$ is reliably smaller than the upper limit torque $ULT_G$, which is not subjected to the filtering process, by approximately the margin $\delta_M$. Therefore, the electric power consumption of the electrical generator 15 is reliably within the range of the output possible electric power $P_{out}$ of the battery 11.

In this modification, the margin $\delta_M$ is a fixed value determined in advance, but the margin OM is preferably a variable value in accordance with the temperature (the engine oil temperature $T_{oil}$) of the engine 14. As described above, as the temperature of the engine 14 becomes lower, the required electric power $NP_{out}$ becomes larger in an exponential manner, and thus as the temperature of the engine 14 becomes lower, the actual electric power consumption of the electrical generator 15 also increases. Accordingly, by setting the margin $\delta_M$ as the variable value in accordance with the temperature of the engine 14, and setting, for example, the required electric power $NP_{out}$ to become larger in an exponential manner as the temperature of the engine 14 becomes lower, the safety is ensured regardless of the temperature of the engine 14.

As described above, the above embodiment relates to a method for controlling starting of a power generation system (10) including an internal combustion engine (14) as a power source, an electrical generator (15), and a power transmission mechanism (16) that transmits power between the internal combustion engine (14) and the electrical generator (15), the method executes a rotation speed control of driving the electrical generator (15) by using electric power supplied from a battery (11), and matching a rotation speed ($N_G$) of the electrical generator (15) with a target rotation speed ($N_G^*$) at the time of starting the power generation system. According to the method for controlling starting of a power generation system, output possible electric power ($P_{out}$) of the battery (11) is acquired, and the rotation speed ($N_G$) of the electrical generator (15) is acquired. A filtering process of reducing a component of a resonance frequency band ($B_{RF}$) of a spring-mass system including the internal combustion engine (13), the electrical generator (15), and the power transmission mechanism (16) is executed on the rotation speed ($N_G$) of the electrical generator (15). Further, an upper limit torque ($ULT_{G\text{-}flt}$) that is an upper limit value of a torque ($T_G$) of the electrical generator (15) is calculated based on the filtered rotation speed ($N_{G\text{-}flt}$) of the electrical generator (15) and the output possible electric power ($P_{out}$). In addition, the rotation speed control is executed under a limitation of the upper limit torque ($ULT_{G\text{-}flt}$).

As described above, by executing the start control in the second cryogenic start mode using the upper limit torque $ULT_{G\text{-}flt}$, even when the output possible electric power $P_{out}$ of the battery 11 is insufficient in the cryogenic environment, the resonance frequency band $B_{RF}$ can be rapidly passed through. As a result, the vibration occurred in the power generation system 10 is reduced or restrained. Further, since the resonance frequency band $B_{RF}$ can be rapidly passed through, the occurrence of the failure that the allowable limit of the damper or the like constituting the power transmission mechanism 16 is exceeded is also reduced or restrained.

In particular, in the method for controlling starting of a power generation system according to the above modification, a margin ($\delta_M$) is set for the output possible electric power ($P_{out}$), and the upper limit torque ($ULT_{G\text{-}flt}$) is calculated based on the filtered rotation speed ($N_{G\text{-}flt}$) of the electrical generator (15) and a deviation ($P_{out}-\delta_M$) obtained by subtracting the margin ($\delta_M$) from the output possible electric power ($P_{out}$). In this way, by setting the margin $\delta_M$ with respect to the output possible electric power $P_{out}$ of the battery 11, the electric power consumption of the electrical generator 15 does not exceed the output possible electric power $P_{out}$ of the battery 11. That is, the method for controlling starting of a power generation system according to the above modification allows the electrical generator rotation speed $N_G$ to rapidly pass through the resonance frequency band $B_{RF}$ while ensuring the safety.

Further, in the method for controlling starting of a power generation system according to the above modification, the margin ($\delta_M$) is a variable value corresponding to a temperature of the internal combustion engine (14). Accordingly, since the margin $\delta_M$ is the variable value in accordance with the temperature of the internal combustion engine (14), the safety is particularly ensured regardless of the specific temperature of the engine 14.

In the method for controlling starting of a power generation system according to the above embodiment and the above modification, the rotation speed control is executed under the limitation of the upper limit torque ($ULT_{G\text{-}flt}$) subjected to the filtering process at least when a temperature of the internal combustion engine (14) is equal to or lower than a predetermined temperature ($TH_{oil}$) determined in advance and the output possible electric power ($P_{out}$) is smaller than electric power ($NP_{out}$) required for driving the electrical generator (15). That is, at least in the second cryogenic start mode $S_{LT2}$, the rotation speed control of the electrical generator 15 is executed under the limitation of the upper limit torque $ULT_{G\text{-}flt}$ subjected to the filtering process. As described above, in a scene in which the power generation system 10 needs to be started in the second cryogenic start mode $S_{LT2}$, in particular, a control period of the second stage $Ph_2$ is prolonged, and the electrical generator rotation speed $N_G$ and the engine rotation speed $N_E$ is likely to stay in the resonance frequency band $B_{RF}$. Therefore, as described above, since the rotation speed control is executed under the limitation of the upper limit torque $ULT_{G\text{-}flt}$, the control period of the second stage $Ph_2$ is likely to be shortened. That is, the method for controlling starting of a power generation system according to the above embodiment and the above modification is particularly effective when the start control method is executed in the second cryogenic start mode $S_{LT2}$.

In the method for controlling starting of a power generation system according to the above embodiment and the above modification, the target rotation speed ($N_G^*$) is set to a first target rotation speed ($N_{G1}^*$) that is a rotation speed lower than the resonance frequency band ($B_{RF}$), and the internal combustion engine (14) is ignited. When the internal combustion engine (14) starts to output a torque due to combustion after the ignition, the target rotation speed ($N_G^*$) is set from the first target rotation speed ($N_{G1}^*$) to a second target rotation speed ($N_{G2}^*$) at which the rotation speed ($N_G$) is increased to a rotation speed higher than the resonance frequency band ($B_{RF}$). Further, the rotation speed control is executed under the limitation of the upper limit torque ($ULT_{G\text{-}flt}$) subjected to the filtering process at least when the target rotation speed ($N_G^*$) is set to the second target rotation speed ($N_{G2}^*$). That is, at least in the control of the second stage $Ph_2$ in the second cryogenic start mode $S_{LT2}$, the rotation speed control is executed under the limitation of the upper limit torque $ULT_{G\text{-}flt}$ subjected to the filtering process. As described above, in the second stage $Ph_2$ in the second cryogenic start mode $S_{LT2}$, the electrical generator torque $T_G$ is limited by the upper limit torque $ULT_G$ that is not subjected to the filtering process, and the electrical generator rotation speed $N_G$ and the engine rotation speed $N_E$ are likely to stay in the resonance frequency band $B_{RF}$. Therefore, as described above, the upper limit torque $ULT_{G\text{-}flt}$ subjected to the filtering process is used at least in the control of the second stage $Ph_2$, and thus the electrical generator rotation speed $N_G$ and the engine rotation speed $N_E$ are less likely to stay in the resonance frequency band $B_{RF}$. That is, the start control method for a power generation system according to the above embodiment and the above modification is most effective when the start control method is particularly executed in the second stage $Ph_2$ in the second cryogenic start mode $S_{LT2}$.

The above embodiment and the above modification relate to a device for controlling starting of a power generation system (10) including an internal combustion engine (14) as a power source, an electrical generator (15), and a power transmission mechanism (16) that transmits power between the internal combustion engine (14) and the electrical generator (15), the device includes a controller (13) configured to execute a rotation speed control of driving the electrical generator (15) by using electric power supplied from a battery (11), and matching a rotation speed ($N_G$) of the electrical generator (15) with a target rotation speed ($N_G^*$) at the time of starting the power generation system. The controller (13) acquires output possible electric power ($P_{out}$) of the battery (11), and acquire the rotation speed ($N_G$). The controller (13) executes, on the rotation speed ($N_G$), a filtering process of reducing a component of a resonance frequency band ($B_{RF}$) of a spring-mass system including the internal combustion engine (14), the electrical generator (15), and the power transmission mechanism (16). Further, the controller (13) calculates, based on the filtered rotation speed ($N_{G\text{-}flt}$) and the output possible electric power ($P_{out}$), an upper limit torque ($ULT_{G\text{-}flt}$) that is an upper limit value of a torque ($T_G$) of the electrical generator (15). Further, the controller (13) executes the rotation speed control under a limitation of the upper limit torque ($ULT_{G\text{-}flt}$).

Although the embodiment of the present invention has been described above, configurations described in the above embodiment and the modifications are only a part of application examples of the present invention, and are not intended to limit the technical scope of the present invention.

The invention claimed is:

1. A method for controlling starting of a power generation system including an internal combustion engine as a power source, an electrical generator, and a power transmission mechanism that transmits power between the internal combustion engine and the electrical generator, the method executing a rotation speed control of driving the electrical generator by using electric power supplied from a battery, and matching a rotation speed of the electrical generator with a target rotation speed at a time of starting the power generation system, the method comprising:
   acquiring output possible electric power of the battery;
   acquiring the rotation speed;
   calculating, based on the rotation speed and the output possible electric power, a first upper limit torque that is an upper limit value of a torque of the electrical generator;
   executing, on the rotation speed, a filtering process of reducing a component of a resonance frequency band of a spring-mass system including the internal combustion engine, the electrical generator, and the power transmission mechanism;
   calculating, based on a filtered rotation speed and the output possible electric power, a second upper limit torque that is an upper limit value of the torque of the electrical generator;
   executing the rotation speed control under a limitation of the first upper limit torque when a temperature of the internal combustion engine is higher than a predetermined temperature determined in advance or when the output possible electric power is equal to or larger than electric power required for driving the electrical generator; and
   executing the rotation speed control under a limitation of the second upper limit torque when the temperature of the internal combustion engine is equal to or lower than the predetermined temperature and the output possible electric power is smaller than the electric power required for driving the electrical generator.

2. The method for controlling starting of a power generation system according to claim 1, wherein
   a margin is set for the output possible electric power, and
   the second upper limit torque is calculated based on the filtered rotation speed and a deviation obtained by subtracting the margin from the output possible electric power.

3. The method for controlling starting of a power generation system according to claim 2, wherein the margin is a variable value corresponding to the temperature of the internal combustion engine.

4. The method for controlling starting of a power generation system according to claim 1, wherein
   the target rotation speed is set to a first target rotation speed that is a rotation speed lower than the resonance frequency band,
   the internal combustion engine is ignited,
   when the internal combustion engine starts to output a torque due to combustion after the ignition, the target rotation speed is set from the first target rotation speed to a second target rotation speed obtained by increasing the rotation speed to a rotation speed higher than the resonance frequency band, and
   the rotation speed control is executed under the limitation of the second upper limit torque at least when the target rotation speed is set to the second target rotation speed.

5. A device for controlling starting of a power generation system including an internal combustion engine as a power source, an electrical generator, and a power transmission mechanism that transmits power between the internal combustion engine and the electrical generator, the device comprising:
   a controller configured to execute a rotation speed control of driving the electrical generator by using electric power supplied from a battery, and matching a rotation speed of the electrical generator with a target rotation speed at a time of starting the power generation system, wherein the controller is configured to:
   acquire output possible electric power of the battery,
   acquire the rotation speed, calculate, based on the rotation speed and the output possible electric power, a first upper limit torque that is an upper limit value of a torque of the electrical generator, execute, on the rotation speed, a filtering process of reducing a component of a resonance frequency band of a spring-mass system including the internal combustion engine, the electrical generator, and the power transmission mechanism, calculate, based on a filtered rotation speed and the output possible electric power, a second upper limit torque that is an upper limit value of the torque of the electrical generator, execute the rotation speed control under a limitation of the first upper limit torque when a temperature of the internal combustion engine is higher than a predetermined temperature determined in advance or when the output possible electric power is equal to or larger than electric power required for driving the electrical generator, and execute the rotation speed control under a limitation of the second upper limit torque when the temperature of the internal combustion engine is equal to or lower than the predetermined temperature and the output possible electric power is smaller than the electric power required for driving the electrical generator.

\* \* \* \* \*